H. A. SCHESCH.
Oil Still.
No. 54,218.
Patented April 24, 1866.
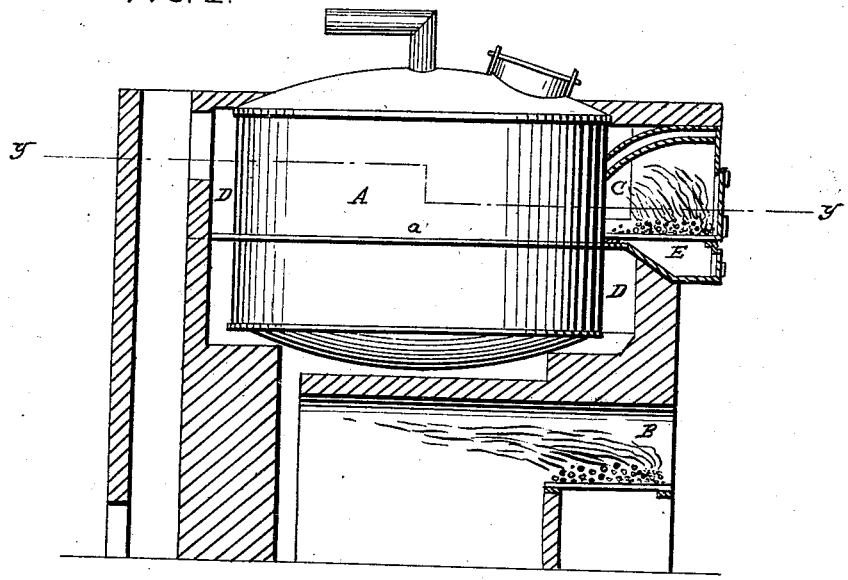
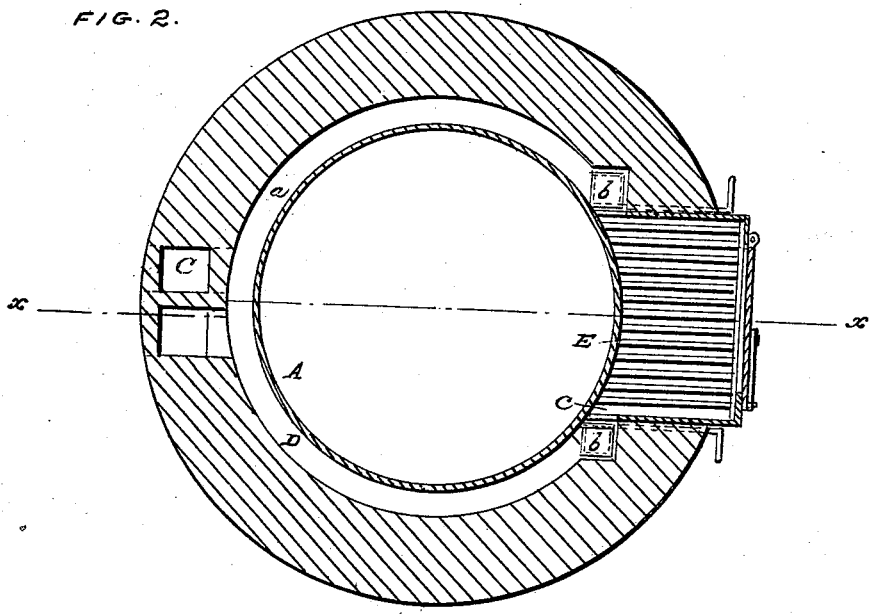

UNITED STATES PATENT OFFICE.

H. A. SCHESCH, OF BROOKLYN, NEW YORK.

IMPROVEMENT IN APPARATUS FOR DISTILLING.

Specification forming part of Letters Patent No. 54,218, dated April 24, 1866.

*To all whom it may concern:*

Be it known that I, H. AUGUST SCHESCH, of the city of Brooklyn, E. D., county of Kings, and State of New York, have invented a new and Improved Distilling Apparatus; and I do hereby declare that the following is a full, clear, and exact description of the same, enabling others skilled in the art to make and use the same, reference being had to the accompanying drawings, forming part of this specification, in which—

Figure 1 represents a vertical central section of this invention, the line $x\ x$, Fig. 2, indicating the plane of section. Fig. 2 is a horizontal section of the same, taken in the plane indicated by the line $y\ y$, Fig. 1.

Similar letters of reference indicate corresponding parts.

This invention consists in exposing the upper portion or vapor-space of a still for petroleum or other liquids to the action of an additional fire from a secondary fire-place built above the main fire-place, which serves to heat the contents of the still in such a manner that all the impurities contained in the vapors are precipitated, and the oil or product obtained is whiter or purer than that obtained from an ordinary distilling apparatus.

A represents a still of wrought-iron, cast-iron, or any other suitable material, and of an upright cylindrical or of a horizontal or any other suitable form or shape. This still is set over the fire-place B, which is so situated that a fire built in the same strikes the bottom of the still and heats the contents thereof in the ordinary manner. From the middle of the still projects a flange, $a$, which touches the furnace-wall all around, so that the combustion-chamber D is separated in two compartments, which communicate with each other through openings $b$, that can be closed by means of dampers, as shown in Fig. 2. When these dampers are closed the fire from the fire-place B is confined to the lower part of the combustion-chamber, which connects, by means of a suitable flue, with the chimney or smoke-stack C.

The upper part of the combustion-chamber communicates, through apertures $c$, with the secondary fire-place E, which is built above the main fire-place B, as clearly shown in Fig. 1 of the drawings.

When a fire is built in the secondary fire-place the products of combustion pass through the apertures $c$ into the upper part of the combustion-chamber and heat the upper or vapor space of a still, so that the vapor contained in the same is superheated, and by these means all the impurities mixed with said vapors are caused to precipitate; whereas in stills of ordinary construction the vapors are liable to carry up some impurities and to yield an impure product. This defect is particularly objectionable in stills for petroleum, since it is the main cause of the coloring of the oil as the same runs from the still. In my still said defect is entirely avoided, and yields a whiter and purer product than any still known to me.

What I claim as new, and desire to secure by Letters Patent, is—

Exposing the upper part or vapor-space of a still to the action of an additional fire built in a secondary fire-place, substantially in the manner and for the purposes set forth.

H. AUGUST SCHESCH.

Witnesses:
 THEO. TUSCH,
 W. HAUFF.